May 25, 1937.  E. L. KRAFT  2,081,486

AUTOMOBILE VENTILATOR

Filed March 28, 1933  3 Sheets-Sheet 1

Inventor
Edward L. Kraft
By Bacon & Thomas
Attorneys

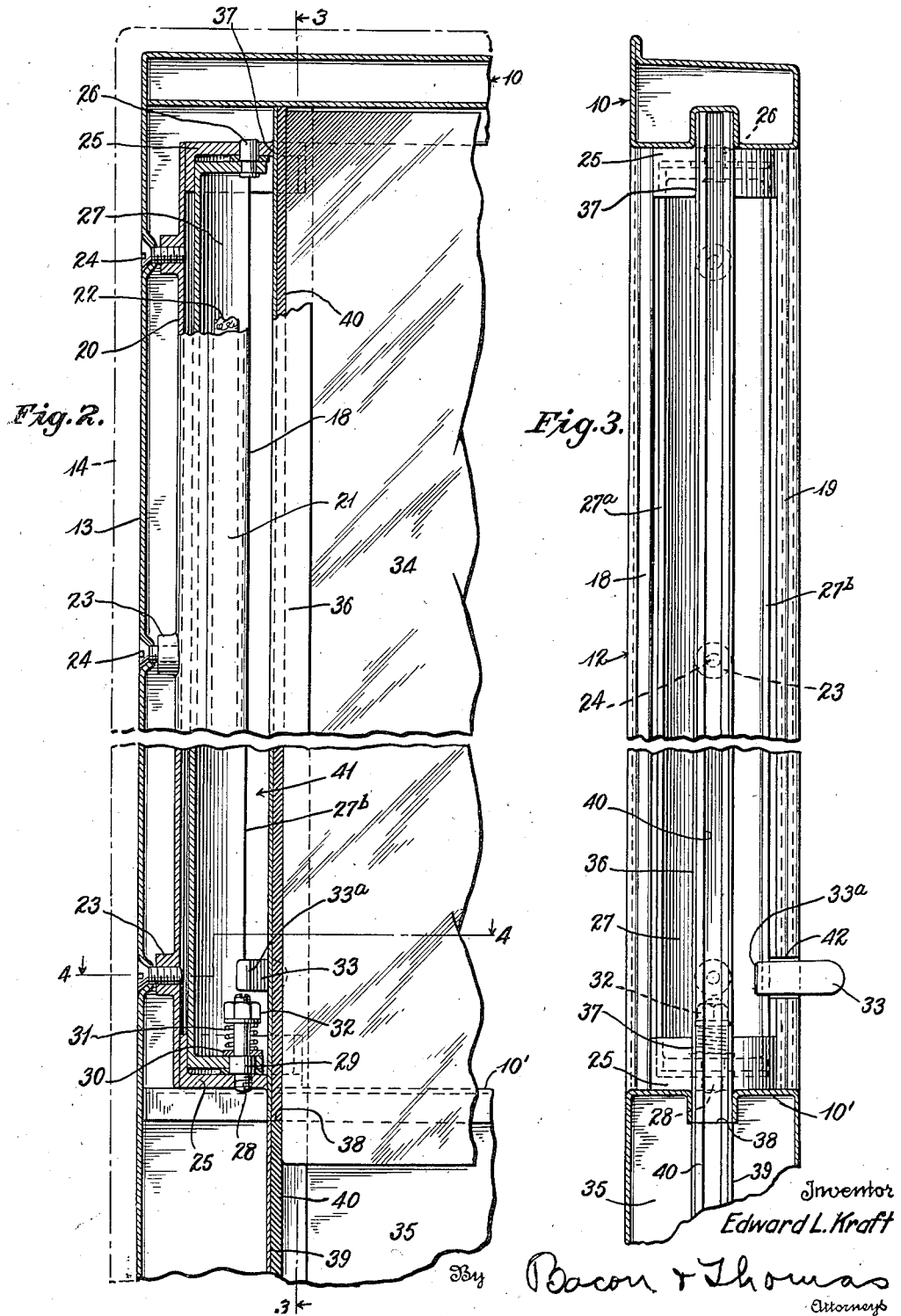

May 25, 1937.  E. L. KRAFT  2,081,486
AUTOMOBILE VENTILATOR
Filed March 28, 1933    3 Sheets-Sheet 3
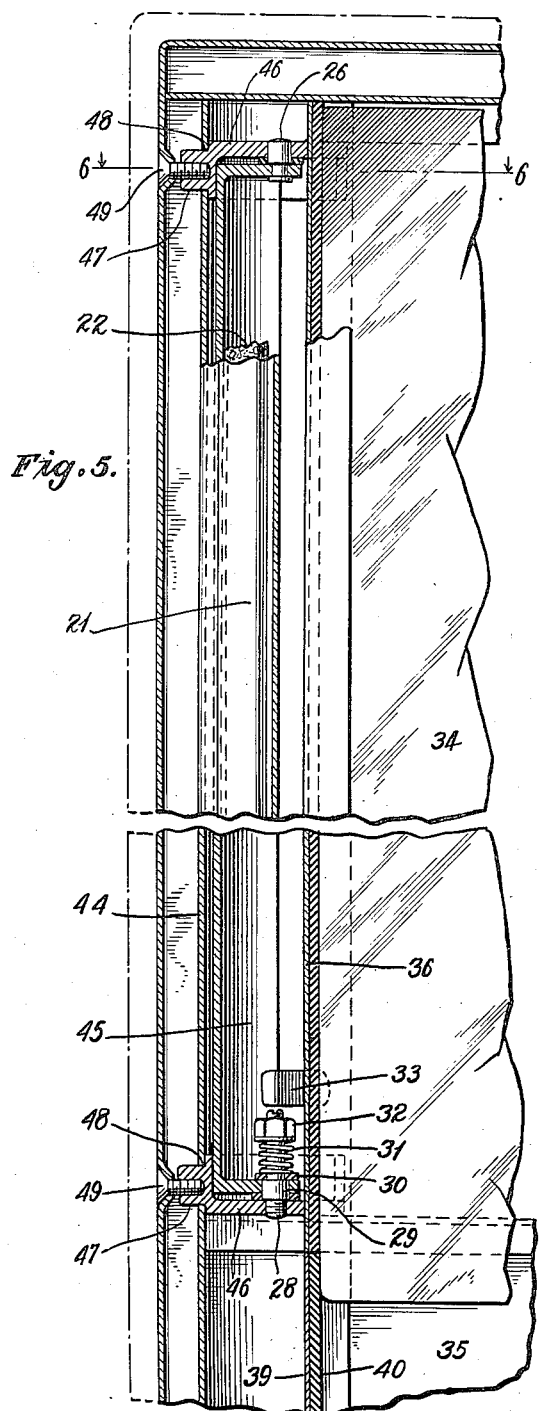
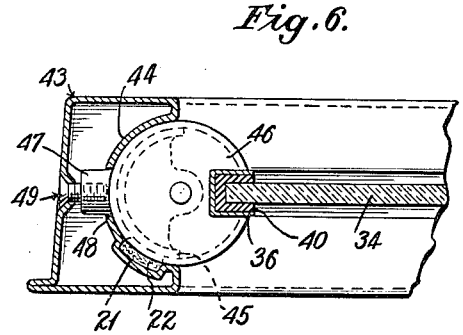
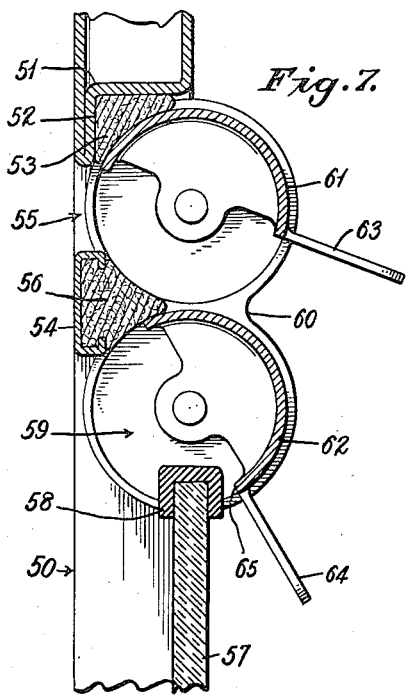
Inventor
Edward L. Kraft
By Bacon & Thomas
Attorneys Patented May 25, 1937

2,081,486

UNITED STATES PATENT OFFICE 2,081,486

AUTOMOBILE VENTILATOR

Edward L. Kraft, York, Pa., assignor to Martin-Parry Corporation, York, Pa., a corporation of Delaware Application March 28, 1933, Serial No. 663,222

8 Claims. (Cl. 98—2)

This invention relates to new and useful improvements in ventilators for automobiles of the closed body type.

The primary object of this invention is to provide a ventilating means for any one of the numerous openings formed in the walls of a closed automobile body.

A further object of the invention is to provide a ventilating unit which may be operatively associated with a window opening formed in a side wall of a motor vehicle body, said ventilator unit being adapted to cooperate with the conventional sliding transparent panel normally employed for controlling the passage of air through said window opening.

A still further object of the invention is to provide novel means for mounting a pivoted ventilator member on one of the marginal portions or frame parts of a window opening formed in a side wall of a closed automobile body.

Other objects and advantages of the invention will be apparent during the course of the following description:

In the accompanying drawings forming a part of this specification and in which like numerals are employed to designate like parts throughout the same, Figure 1 is a fragmentary side elevational view of an automobile body with an embodiment of the present invention operatively associated with the window opening illustrated as being formed therein;

Figure 2 is a vertical sectional view of the ventilator unit shown in Fig. 1;

Figure 3 is a vertical sectional view taken on line 3—3 of Fig. 2;

Figure 5 is a vertical sectional view of a slightly modified form of this invention;

Figure 6 is a horizontal sectional view taken on line 6—6 of Fig. 5; and

Figure 7 is a fragmentary vertical sectional view of a further form of ventilator structure.

Figure 1:
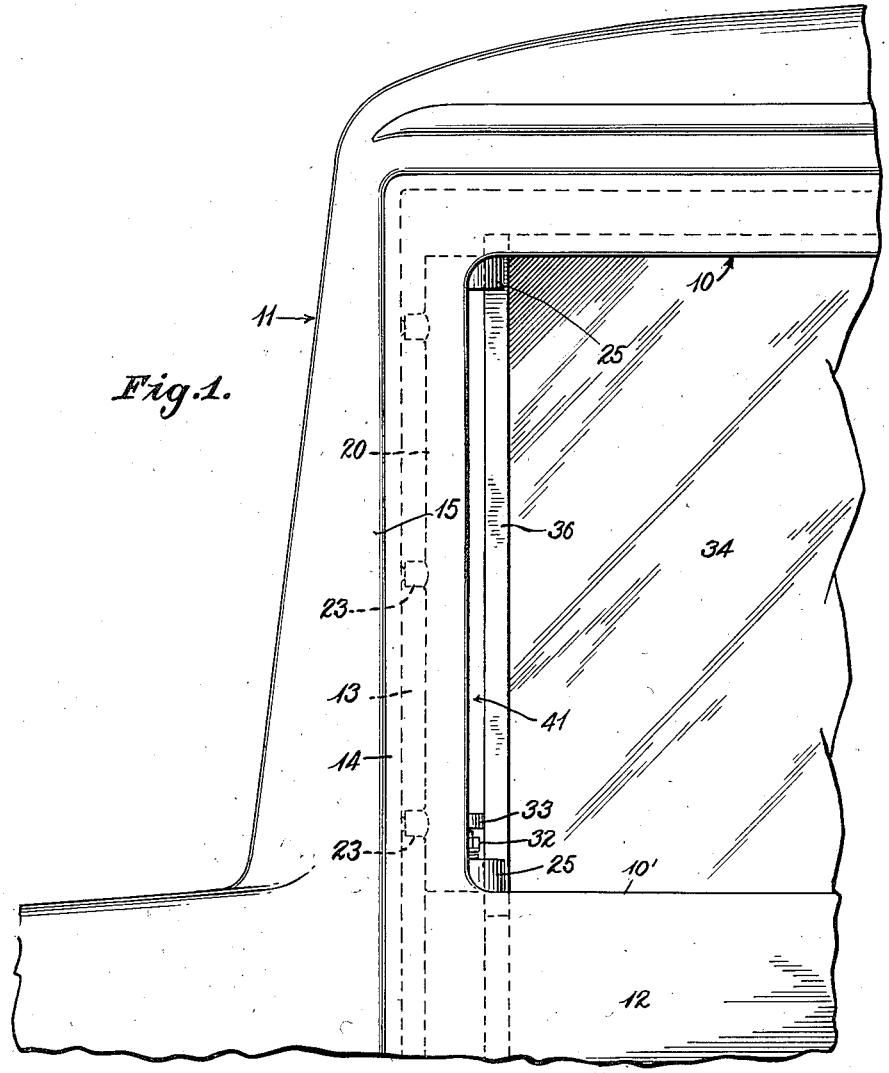

In the drawings, wherein for the purpose of illustration, are shown several preferred embodiments of this invention, the numeral 10, in Fig. 1, designates a window opening formed in the side wall of the automobile body 11. This particular opening 10 is illustrated as being formed in the door 12 which is arranged on one side of the body and is adjacent the windshield. It is to be understood that the window opening 10 may be the opening formed in any other portion of the walls of a closed automobile body.

Figure 4:
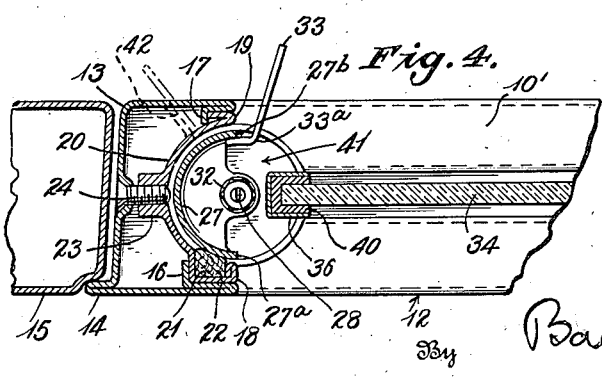
Figure 4 is a horizontal sectional view taken on lines 4—4 of Fig. 2.

In Fig. 4, the door 12 is illustrated as including a hollow, pressed-metal pillar 13 which constitutes one of the marginal portions of the window opening 10 and which also acts as a portion of the forward edge of the door. This hollow pillar 13 is formed with the conventional sealing flange 14 adapted to overlap the post or door frame member 15. The hollow pillar 13 is open at its inner side and is formed with edge flanges 16 and 17. These flanges are shaped to form pockets or seats to receive the edge portions 18 and 19 of a trough-shaped housing 20. The edge 18 of the housing is shaped to provide a longitudinally extending groove 21 for receiving a sealing or packing strip 22. At suitable intervals, the housing 20 is provided with bosses 23 which are apertured and internally screw threaded to receive the screws 24. These screws function to retain the housing 20 properly positioned with respect to the pillar 13 to close the open side of the latter and are inserted through the exposed outer face of the said pillar to permit ready access to the screws when the door is moved to an open position.

In Fig. 2 the housing 20 is illustrated as being completed at its opposite ends by mounting brackets or end plates 25. One of these mounting brackets or end plates 25 is centrally apertured to receive the journal 26 suitably fastened to the end of a trough-shaped ventilator body 27. The remaining mounting bracket or end plate 25 is centrally apertured and screw threaded to have connected thereto the threaded terminal 28 of a pivot pin which is provided with a smooth bearing portion 29 adapted to have rotatably mounted thereupon the remaining end of the trough-shaped ventilator body 27. A friction disk or washer 30 is mounted upon the pivot pin and engages one surface of the end of the ventilator body 27 to retain this body in any desired position of adjustment by means of friction developed between the element 30 and the said body due to the provision of a compression spring 31 which encircles a portion of the pivot pin. This compression spring is retained in place and under proper compression by means of the nut and washer elements 32, the nut being threaded upon the outer end of the pivot pin.

A suitable operating arm or handle 33 is secured to a portion of the trough-shaped ventilator 27 and may be employed for moving this ventilator member into any desired position of adjustment.

The window opening 10 has slidably positioned therein a transparent panel 34 which may be moved by any suitable operating mechanism between two extreme positions of adjustment. In Figs. 1 and 2, this transparent panel 34 is illustrated as being arranged in its closed position. It may be moved from this closed position by being slid downwardly into the well 35 formed in the door 12. Sliding transparent panels for the various window openings formed in the side walls of automobile bodies are provided with guiding channels or grooves for the opposite vertical edges. The vertical edge of the transparent panel 34, not illustrated in the several figures, is provided with the usual guide. The edge of the panel illustrated in these figures is provided with a sectional guide or channel, the upper section 36 being illustrated as being suitably secured to the mounting brackets or end plates 25 of the housing 20. These members 25 are suitably notched out or cut away at 37 to accommodate the guide. The lower end of this guide section terminates at 38 or at a point below the bottom edge 10' of the window opening 10. A second section 39 is located in the well 35 and is arranged in alignment with the first section 36. Suitable packing material 40 is provided for this two-part guide.

It will be seen, by inspecting Figs. 1 and 4, that a ventilating opening or passageway 41 is provided between the outer face of the guide section 36 and the trough-shaped ventilator member 27. This ventilating opening or passageway is adapted to be controlled by the ventilator body 27. This body may be moved through the major portion of a circle so that the outer longitudinal edge 27a may be arranged in contact with the outer face of the guide section 36 wherein the passageway or opening 41 is closed. By moving the ventilator member 27 to the fullest extent in the opposite direction, the heel 33a of the handle 33 will engage the inner side face of the guide section 36. It will be seen that a narrow slot then will be provided between the edge 27b of the ventilator body and the guide section 36. To accommodate the handle 33 when the ventilator body is moved to the closed position with its edge 27a in contact with the guide section 36, the pillar 13 is formed with a depressed portion 42.

It will be seen that this ventilator unit constitutes a complete assembly which readily may be put in place and removed by merely withdrawing the various retaining screws 24. The complete assembly includes the housing 20, with its end plates 25, the ventilator body 27 with its end mountings or pins, and the guide section 36.

In the embodiment illustrated in Figs. 1 to 4 inclusive, this ventilator assembly or unit is associated with the forward margin of the window opening 10. It will be understood, therefore, that when the vehicle equipped with this ventilator unit moves in a forward direction, air will flow over the side surface of the car body. Due to the fact that the transparent panel 34 is arranged in a plane spaced laterally, inwardly, of the outer face or skin of the side wall of the vehicle, air which passes over the outer surface of the pillar 13 will move inwardly to contact or flow over the outer surface of the transparent panel 34. This movement of the air will create a low pressure area at the mouth of the passageway 41 which will result in the sucking of air through the passageway from the interior of the closed vehicle body. The amount of air sucked through this passageway 41 may be controlled by adjusting the ventilator body 27. With the body arranged in the previously described position wherein the heel 33a of the handle 33 is in contact with the inner face of the guide 36, the narrow slot left between the edge 27b of the ventilator body and the guide 36 will cause a stream or film of air to flow over the inner surface of the transparent panel 34. This movement of air over the surface of the panel will prevent the accumulation of steam, frost, or the like, on the inner surface of the panel.

It will be noted that the packing or sealing strip 22 is interposed between the housing 20 and the ventilator body 27. This sealing strip will prevent the passage of air, moisture, or the like, into the space between the housing and the ventilator body during most positions of adjustment of the said body, and, particularly, when the body is in its outer closed position.

While this ventilator unit or complete assembly is illustrated as being associated with the front pillar or edge portion of the door 12, it readily will be seen that the unit may be associated with the rear edge portion of the window opening 10 or with the top portion. The only difference in the mode of operation of the ventilator unit when arranged in these two alternative positions will be the normal direction of flow of air through the slot or passageway controlled by the ventilator body. In connection with this direction of flow of air, it will be understood that if the passageway 41 constitutes the sole opening for the transfer of air between the interior and exterior of the car body, due to the fact that all other window openings are entirely closed, air will pass both inwardly and outwardly with respect to the interior of the body through this single opening. This is due to the fact that air passing through the passageway 41, in the normal direction, will create a difference in pressure between the interior and the exterior of the car body which will have to be overcome by a reverse flow of air through the passageway.

It will be noted that the ventilator unit or assembly is housed to a considerable extent within the normal confines of the pillar or window frame portion 13. The unit, therefore, will not materially affect visibility. The guide section 36 for the transparent panel 34 is positioned in rather close proximity to the inner face of the pillar 13 and will fall within the normal "blind spot" provided by the pillar 13 and the corner post 15. This will be readily appreciated by visualizing the location of the driver's eyes with respect to the guide section 36 and pillar 13 in Figs. 1 and 4.

Figs. 5 and 6 disclose a slightly modified form of the invention. In this form, the pillar 43 is closed at its inner side by a permanent wall 44 which is trough-shaped in transverse section. The ventilator body 45 is mounted in this trough-shaped depression, formed by the curved wall 44, by means of mounting brackets or end plates 46, which are formed with integral bosses 47 insertable through apertures 48 formed at suitable spaced intervals in the trough-shaped wall 44. Retaining screws 49 are provided for holding the end plates 46 with their integral bosses inserted through the apertures 48. All other elements of this modified form of ventilating means are similar in construction to the elements of the previously described embodiment of the invention and similar reference numerals, therefore, will be applied thereto.

In Fig. 7 there is shown a modified form of ventilator which includes a windshield frame 50. This frame is formed with a header portion 51 shaped to provide a pocket 52 to receive a sealing strip 53. A bar 54 of channel formation is carried by the windshield frame 50 and is spaced from the header portion 51 to provide a ventilator opening 55. This trough-shaped bar 54 functions to retain a sealing or packing strip 56. The conventional transparent windshield panel 57 is suitably carried by the windshield frame 50, but it will be noted that the upper edge of this panel, which has mounted thereon a suitable sealing strip 58, is spaced from, or terminates short of, the position of the bar 54 to provide a ventilating opening 59. The windshield frame 50 has suitably mounted thereon an end bracket 60. It is to be understood that this type of end bracket is duplicated at the opposite side of the windshield frame. The two end brackets 60 pivotally support the two trough-shaped ventilator bodies 61 and 62. The ventilator body 61 is provided with an operating handle 63 by means of which it may be arranged in any desired position of adjustment for either entirely preventing the passage of air through the ventilating opening 55, or for permitting any desired amount of air to pass therethrough.

The ventilator body 62 is formed with a handle 64 having a heel 65. The handle functions to permit adjustment of the ventilator body 62. With the heel 65 of the handle 64 in contact with the sealing strip 58 of the transparent panel 57, a narrow slot will be provided between the inner edge of the body 62 and the sealing strip 58. This narrow slot will permit a narrow stream or film of air to pass into the car body equipped with this ventilating mechanism and the curvature of the ventilator body 62 will cause this stream of air to flow downwardly over the inner surface of the transparent panel 57. This flow of air over the panel will prevent the accumulation of steam, frost, or the like, on the surface of the panel.

While the ventilator body 62 is functioning to prevent the accumulation of steam, frost, or the like on the inner surface of the windshield glass panel 57, the remaining ventilator body 61 may be adjusted to permit any desired amount of ventilation within the car body. It will be noted that these two ventilator bodies are mounted on common end brackets 60 and the space between the same is suitably closed by a common sealing strip 56.

It is to be understood that the forms of this invention herewith shown and described are to be taken as preferred examples of the same and that various changes in the shape, size, and arrangement of parts may be resorted to without departing from the spirit of the invention or the scope of the subjoined claims.

Having thus described the invention, I claim:

1. Ventilating means for automobiles of the closed body type comprising a body having an opening formed in a wall thereof with a well located in the wall below the opening, a pillar forming one margin of said opening, a transparent panel slidable between a position closing a portion of said opening and a position within the well, a support for one edge of said panel mounted on the pillar, a ventilator member arranged to control the remainder of said opening, and means for pivotally mounting said member on said pillar to move about an axis arranged intermediate opposite edges of the same.

2. Ventilating means for automobiles of the closed body type comprising a body having an opening formed in the wall thereof with a well located in the wall below the opening, a pillar forming one margin of said opening, a transparent panel slidable in the plane of the body wall between positions in the well and the opening, a support for one edge of the panel mounted on the pillar in spaced relation thereto to form a ventilating slot therebetween, and a ventilator member mounted on the pillar to control said slot.

3. Ventilating means for automobiles of the closed body type comprising a body having an opening formed in a wall thereof, a pillar forming a margin of said opening, a transparent panel slidably arranged in a portion of said opening, a support for one edge of said panel, a pivoted ventilator arranged in the remainder of said opening, and means secured to the pillar for supporting the ventilator and said panel support.

4. A unitary ventilator assembly adapted to be associated with a window opening in a closed vehicle body wall, comprising a channel-shaped housing, a ventilator body pivotally mounted in the housing, and a window panel guide fastened to said housing in spaced relation to the edges of the housing channel, said ventilator being movable to control passage of air between the housing and guide.

5. A unitary ventilator assembly adapted to be associated with a window opening in a closed vehicle body wall, comprising a channel-shaped housing, a ventilator body pivotally mounted in the housing, a window panel guide fastened to said housing in spaced relation to the edges of the housing channel, said ventilator being movable to control passage of air between the housing and guide, and packing means carried by the housing to prevent leakage between the housing and ventilator body.

6. Ventilating means for automobiles of the closed body type comprising a body having an opening formed in a wall thereof, one of the marginal parts of said opening having a depression of semi-circular section formed therein, and a ventilator of semi-circular section pivotally mounted and positioned in said depression.

7. Ventilating means for automobiles of the closed body type comprising a body having an opening formed in a wall thereof, one of the marginal parts of said opening having a depression formed therein, mounting brackets secured in said depression, a ventilator member supported by said brackets in said depression, and means carried by one of said brackets for holding the ventilator in any adjusted position.

8. Ventilating means for automobiles of the closed body type comprising a body having an opening formed in a wall thereof, one of the marginal parts of said opening having a depression formed therein, mounting brackets secured in said depression, a guide for a sliding window panel fastened to said bracket, and a ventilator member supported by said brackets.

EDWARD L. KRAFT.